United States Patent
Paesano (10) Patent No.: US 12,286,240 B2
(45) Date of Patent: Apr. 29, 2025

(54) SYSTEM AND METHOD FOR REMOVING A METAL CAP FROM A MAIN BODY OF A ROTOR BLADE OF A HELICOPTER

(71) Applicant: THE BOEING COMPANY, Arlington, VA (US)

(72) Inventor: Antonio Paesano, Wilmington, DE (US)

(73) Assignee: The Boeing Company, Arlington, VA (US)

( * ) Notice: Subject to any disclaimer, the term of this patent is extended or adjusted under 35 U.S.C. 154(b) by 34 days.

(21) Appl. No.: 18/346,299

(22) Filed: Jul. 3, 2023

(65) Prior Publication Data

US 2025/0011008 A1 Jan. 9, 2025

(51) Int. Cl.
*B23P 11/00* (2006.01)
*B64F 5/40* (2017.01)

(52) U.S. Cl.
CPC ..................................... *B64F 5/40* (2017.01)

(58) Field of Classification Search
CPC combination set(s) only.
See application file for complete search history.

(56) References Cited

U.S. PATENT DOCUMENTS 5,297,327 A * 3/1994 Waldsmith ................ B09B 5/00
29/DIG. 96
2015/0041330 A1* 2/2015 Loftus, Jr. .................. C25F 5/00
205/640

FOREIGN PATENT DOCUMENTS

DE 10128413 C1 * 12/2002 ................ B60S 5/00

OTHER PUBLICATIONS

English translation of DE10128413 (Year: 2002).*

* cited by examiner

*Primary Examiner* — Jun S Yoo
(74) *Attorney, Agent, or Firm* — Joseph M. Butscher; The Small Patent Law Group LLC (57) ABSTRACT

A system and a method for removing a first component from a second component of an assembly include retaining cooling agent within a first retaining chamber of a first container; disposing at least a portion of the assembly within the first retaining chamber so that the first component is covered by the cooling agent within the first retaining chamber; coupling a refrigerant line to a second retaining chamber of a second container; fluidly connecting the first retaining chamber to the second retaining chamber by a conduit; removing the at least a portion of the assembly from the first retaining chamber after a predetermined period of time when the first component is readily removable from the second component; draining the cooling agent into the second retaining chamber via the conduit after said removing the at least a portion of the assembly from the first retaining chamber; and cooling fluid circulating through the refrigerant line with the cooling agent.

20 Claims, 4 Drawing Sheets

SYSTEM AND METHOD FOR REMOVING A METAL CAP FROM A MAIN BODY OF A ROTOR BLADE OF A HELICOPTER

FIELD OF THE DISCLOSURE

Examples of the present disclosure generally relate to systems and methods for removing a first component, such as a metal erosion cap, from a second component, such as a main or tail rotor blade of a helicopter.

BACKGROUND OF THE DISCLOSURE

A typical helicopter includes rotor blades that are configured to generate lift. A rotor blade includes a main body and a metal cap at a leading edge that is configured to protect against erosion, such as from wind, sand, and the like. The main body can be formed of a composite material, and the metal cap can be formed from Nickel (Ni), for example.

Over time, the metal cap may need to be removed from the main body. For example, the metal cap may wear and/or otherwise degrade from effects of erosion. In order to remove the metal cap, an individual typically uses a chisel, hammer, and/or power tools to pry the metal cap at room temperature off the main body. The process of chiseling and prying the metal cap at room temperature off the main body can potentially cause damage to the main or tail rotor blade, for example. Further, such process is time consuming, and labor intensive.

SUMMARY OF THE DISCLOSURE

A need exists for a system and a method for efficiently and effectively removing a metal cap from a main body of a rotor blade (such as a main rotor blade or a tail rotor blade). Further, a need exists for such a system and a method that eliminate, minimize, or otherwise reduce a potential of damaging the main body of a rotor blade.

With those needs in mind, certain examples of the present disclosure provide a system for removing a first component from a second component of an assembly. The system includes a first container defining a first retaining chamber. A cooling agent is retained within the first retaining chamber. At least a portion of the assembly is configured to be disposed within the first retaining chamber so that the first component is covered by the cooling agent within the first retaining chamber. A second container defines a second retaining chamber. A refrigerant line is coupled to the second retaining chamber. A conduit fluidly connects the first retaining chamber to the second retaining chamber. The at least a portion of the assembly is configured to be removed from the first retaining chamber after a predetermined period of time when the first component is readily removable from the second component. The cooling agent is configured to be drained into the second retaining chamber via the conduit after the at least a portion of the assembly is removed from the first retaining chamber. The cooling agent within the second retaining chamber is configured to cool fluid circulating through the refrigerant line, such as is a path to a freezer.

In at least one example, the system also includes the freezer in fluid communication with the refrigerant line. The fluid circulating through the refrigerant line is configured to cool articles stored within the freezer.

In at least one example, the assembly is a rotor blade of a helicopter. The first component is a metal erosion cap. The second component is a main body of the rotor blade. In at least one further example, the metal erosion cap is formed of Nickel, and the second component is formed of a composite material.

In at least one example, one or both of the first container or the second container is an open trough.

In at least one example, the cooling agent includes dry ice, In at least one further example, the cooling agent also includes water.

A first base of the first container can be at a first level that is higher than a second level of a second base of the second container.

In at least one example, the refrigerant line includes one or more condenser coils.

In at least one example, the predetermined period of time is between fifty and seventy minutes. In at least one example, the predetermined period of time depends on one or more of materials, shapes, and sizes of the components.

In at least one example, the first component is configured to be removed from the second component by one or more tools after the at least a portion of the assembly is removed from the first retaining chamber.

Certain examples of the present disclosure provide a method for removing a first component from a second component of an assembly. The method includes retaining cooling agent within a first retaining chamber of a first container; disposing at least a portion of the assembly within the first retaining chamber so that the first component is covered by the cooling agent within the first retaining chamber; coupling a refrigerant line to a second retaining chamber of a second container; fluidly connecting the first retaining chamber to the second retaining chamber by a conduit; removing the at least a portion of the assembly from the first retaining chamber after a predetermined period of time when the first component is readily removable from the second component; draining the cooling agent into the second retaining chamber via the conduit after said removing the at least a portion of the assembly from the first retaining chamber; and cooling fluid circulating through the refrigerant line with the cooling agent.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods that are configured to remove a first component, such as a worn-out metal erosion cap, from a second component, such as a main body of a rotor blade (such as a main rotor blade or a tail rotor blade) of a helicopter.

Figure 1:
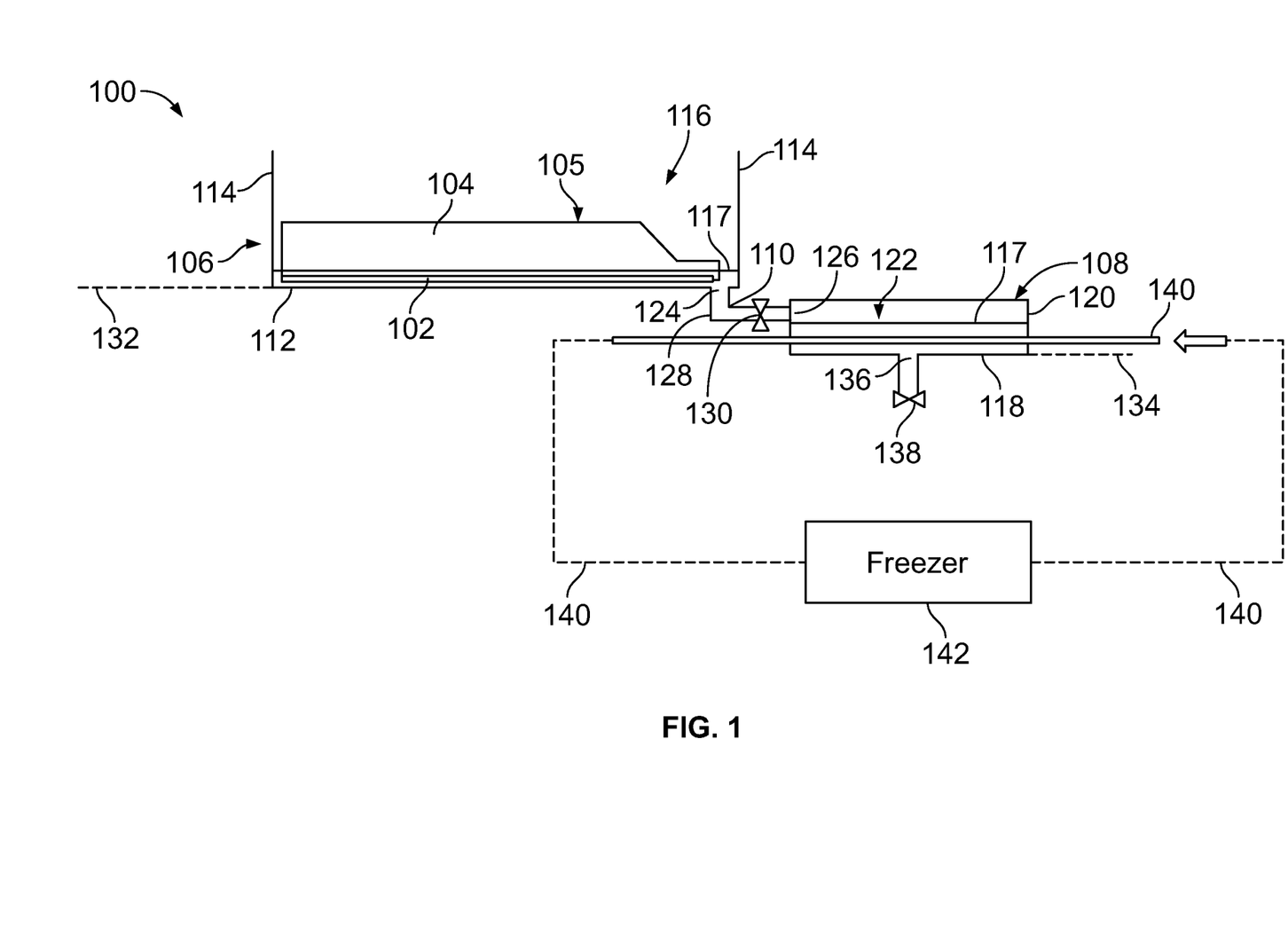
FIG. 1 illustrates a schematic diagram of a system for removing a first component from a second component, according to an example of the present disclosure.

FIG. 1 illustrates a schematic diagram of a system 100 for removing a first component 102 from a second component 104, according to an example of the present disclosure. An assembly 105 includes the first component 102 secured to the second component 104. The first component 102 can be formed of a metal, such as Aluminum (Al), Nickel (Ni), Iron (Fe), or the like. The second component 104 can be formed of a composite material, such as a glass fiber-reinforced epoxy, a carbon fiber-reinforced polymer, and/or the like. In at least one example, the first component 102 is a metal component adhesively attached to the second component 104, which can be a non-metal component, such as a fiber-reinforced polymer matrix composite.

In at least one example, the assembly 105 is a rotor blade of a helicopter. In this example, the first component 102 is a metal cap, and the second component 104 is a main body of the rotor blade of the helicopter. The metal cap is secured to a leading edge of the main body of the rotor blade, and is configured to protect the main body from erosion, wear, and the like. As a further example, the metal cap is formed of Nickel, and the main body is formed of a composite material.

The system 100 includes a first container 106 in fluid communication with a second container 108 via a conduit 110. The first container 106 can be an open trough, for example. Optionally, the first container 106 can be a closed tank. Similarly, the second container 108 can be an open trough, or a closed tank.

The first container 106 includes a base 112 and one or more walls 114 extending upwardly from the base 112. A retaining chamber 116 is defined between the base 112 and the walls 114. A cooling agent 117 is retained within the retaining chamber 116. In at least one example, the cooling agent 117 includes dry ice. As another example, the cooling agent 117 includes dry ice and water. As another example, the cooling agent 117 includes liquid Nitrogen.

The second container 108 includes a base 118 and one or more walls 120 extending upwardly from the base 118. A retaining chamber 122 is defined between the base 118 and the walls 120. Cooling agent 117 is also retained within the retaining chamber 122.

The conduit 110 includes an outlet 124, such as a drain, formed in the base 112 of the first container 106. The outlet 124 connects to an inlet 126 formed in a portion of the second container 108. For example, the inlet 126 can be formed in a portion of a wall 120, a cover, or the like the of the second container 108. The outlet 124 connects to the inlet 126 through an intermediate path 128 of the conduit 110. A valve 130 can be disposed within the intermediate path 128, and is configured to be moveable between an open position and a closed position. The outlet 124 allows the cooling agent 117 to drain from the first container 106 into the intermediate path 128, and into the second container 108 through the inlet 126 when the valve 130 is in the open position.

In at least one example, the base 112 of the first container 106 is at a level 132 that is higher than a level 134 of the base 118 of the second container 108. In this manner, the cooling agent 117 is able to drain from the first container 106 into the second container 108 when the valve 130 is in the open position. Optionally, the first container 106 may not be above a level of the second container 108. In this example, a pump can be used to draw the cooling agent from the first container 106 into the second container 108.

The base 118 of the second container 108 can also include a drain 136. A valve 138 can be disposed within the drain 136. The drain 136 allows the cooling agent 117 to pass out of the second container 108 when the valve 138 is in the open position.

A refrigerant line 140 couples to the second container 108. For example, the refrigerant line 140 can pass into and through the second container 108. Optionally, the refrigerant line 140 can be mounted to an outer surface of a portion of the second container 108. In at least one example, the refrigerant line 140 includes condenser coils.

The refrigerant line 140 is in fluid communication with a freezer 142, which can store various different components that are to be cooled, frozen, and/or the like. For example, the freezer 142 can store adhesives, prepregs, sealants, honeycomb cores, and/or the like.

In operation, in order to remove the first component 102 from the second component 104, the assembly 105 is disposed within the retaining chamber 116 of the first container 106 so that the first component 102 is submerged within the cooling agent 117, such as can include dry ice. The first component 102 remains within the cooling agent 117 for a predetermined period of time, such as between fifty minutes to seventy minutes. It has been found that (given the specific combination of materials, sizes, and shapes of components such as a metal cap and main body of a rotor blade) a period of sixty minutes, plus or minus ten minutes, allows for effective and efficient removal of the first component 102 from the second component 104.

After the predetermined period of time, the assembly 105 is removed from the first container 106. A chisel is then used to separate the first component 102 from the second component 104. One or more wedges can further be used to remove the first component 102 from the second component 104.

In at least one example, the system 100 provides a rotor blade cap removal device that includes the first container 106, such as a first trough supplied with dry ice and water as the cooling agent 117. The first trough is configured to receive the first component 102, such as a metal cap that is adhesively attached to the second component 104, such as a main body of rotor blade.

The cooling agent 117, such as dry ice and water, within the first container 106 is configured to cause internal stress in the adhesive between the first component 102 and the second component 104. The adhesive has a higher coefficient of thermal expansion relative to the first component 102 (such as a metal cap), thereby enabling an imparted force to detach the first component 102 (such as the metal cap) from the second component 104 (such as a main body of a rotor blade).

At least a portion of the cooling agent 117 can be drained into the second container 108, such as when the valve 130 is in the open position. The cooling agent 117 within the second container 108 cools fluid (such as coolant, for example glycol) circulating through the refrigerant line 140. The cooled fluid is then used to maintain a set temperature within the freezer 142, and therefore cool components, materials, semi-finished products, and/or the like contained within the freezer 142.

In at least one example, a method of removing the first component 102 from the second component 104 includes disposing the assembly 105 within the first container 106. Next, the retaining chamber 116 of the first container 106 is filled with the cooling agent 117, such as pellets of dry ice, to a point where the cooling agent 117 covers the first component 102. Next, room temperature water is added. As such, the cooling agent 117 can include the pellets of dry ice and water covering the first component 102. The water fills gaps between the pellets of dry ice, and allows for a more uniform cooling temperature. Optionally, the cooling agent may not include water. A thermocouple can be inserted into the first container 106 to allow for monitoring of the temperature of the cooling agent 117.

After a predetermined period of time after the water has been added (such as fifteen minutes), the assembly 105 can be removed, and an attempt to remove the first component 102 from the second component 104 can be made, such as through use of one or more tools (for example, a chisel and a hammer). If the first component 102 is not readily removable, the assembly 105 can be disposed back into the first container 106 for an additional period of time (such as ten minutes) before a subsequent attempt to remove the first component 102 is made. The process repeats until the first component 102 is readily removed from the second component 104. After the first component 102 is removed from the second component 104, the temperature (Td) of the cooling agent 117 (such as the mixture of dry ice and water), and the time elapsed since water was added, can be recorded for future reference.

In at least one example, if Td is the temperature reached at thermodynamic equilibrium by the mixture of cold dry ice and water after some time for a component made of a specific metal M bonded to a component made of a specific non-metal NM, the mass of dry ice and the mass of room temperature water can be calculated for a component of any size made of M adhesively bonded to components of any size made of NM, by applying the following mixing rule (Richmann's equation):

$$Td = [m(w) \times h(w) \times 15\,C. + m(i) \times h(i) \times -78\,C.]/[m(w) \times h(w) + m(i) \times h(i)].$$

in which m(i), m(w) are the mass (g) of dry ice and water, respectively, and h(i), h(w) are the specific heat capacity (J/gC) of dry ice and water, respectively, and assuming that 15C and −78 C are the temperatures of water and dry ice, respectively, when they are used in this example. The approximation in calculating Td using Richmann's equation is due to the fact that Richmann's law: (a) assumes that there is no heat lost to the surroundings (air, trough), hence the calculated value of Td is higher than the actual value of Td, and (b) does not take in account the phase change experienced by dry ice during the equalization of the temperatures. However, estimating in advance the mass of dry ice and the mass of room temperature water enables the initial design of a trough suited to the size of the metal component. The mass of dry ice for the trough is calculated from the volume of dry ice necessary to completely cover the metal component to be detached.

As described herein, the system 100 is configured to remove the first component 102 from the second component 104 of the assembly 105. The system 100 includes the first container 106 defining the retaining chamber 116. The cooling agent 117 is retained within the retaining chamber 116. At least a portion of the assembly 105 is configured to be disposed within the retaining chamber 116 so that the first component 102 is covered by (for example, submerged within) the cooling agent 117 within the retaining chamber 116. The second container 108 defines the retaining chamber 122. The refrigerant line 140 is coupled to (for example, disposed within, and/or mounted on an outer surface defining) the retaining chamber 122. The conduit 110 fluidly connects the retaining chamber 116 to the retaining chamber 122. The portion of the assembly 105 is configured to be removed from the retaining chamber 116 after a predetermined period of time when the first component 102 is readily removable from the second component 104. The cooling agent 117 is configured to be drained into the retaining chamber 122 via the conduit 110 after the portion of the assembly 105 is removed from the retaining chamber 116. The cooling agent 117 within the retaining chamber 122 is configured to cool fluid circulating through the refrigerant line 140. In at least one example, the freezer 142 is in fluid communication with the refrigerant line 140. The fluid circulating through the refrigerant line 140 is configured to cool articles stored within the freezer 142.

Figure 2:
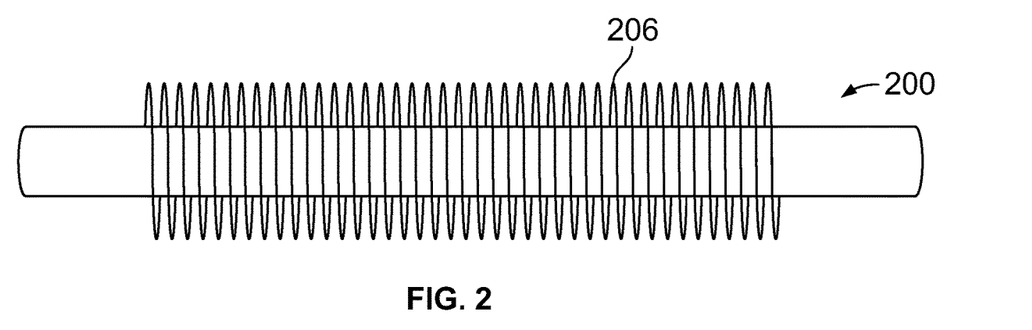
FIG. 2 illustrates a lateral view of a condenser coil, according to an example of the present disclosure.
Figure 3:
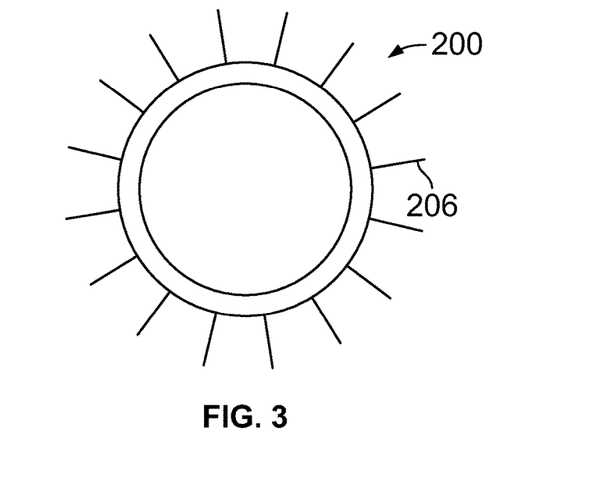
FIG. 3 illustrates an axial view of the condenser coil having head exchanging fins extending along a longitudinal axis of the condenser coil.

FIG. 2 illustrates a lateral view of a condenser coil 200, according to an example of the present disclosure. FIG. 3 illustrates an axial view of a condenser coil 200 having heat exchanging fins aligned along a longitudinal axis of the condenser coil 200. Referring to FIGS. 1-3, the refrigerant line 140 can include the condenser coil 200. For example, the refrigerant line 140 can be formed along a desired length as condenser coils 200.

The condenser coils 200 are in fluid communication with the freezer 142. In at least one example, the freezer 142 includes the condenser coils 200. In at least one example, the freezer 142 stores prepreg rolls of polymer matrix composite materials, adhesive tapes, sealants, and/or the like.

Figure 4:
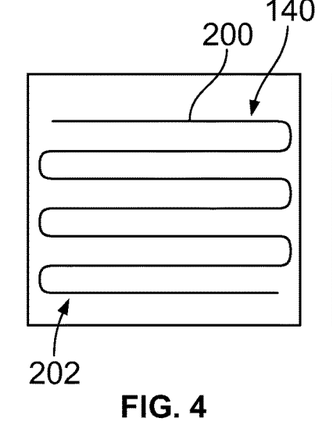
FIG. 4 illustrates a simplified representation of a path of condenser coils of a refrigerant line, according to an example of the present disclosure.
Figure 5:
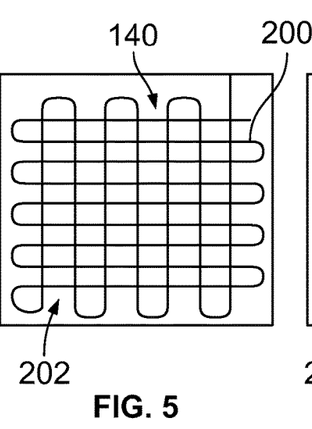
FIG. 5 illustrates a simplified representation of a path of condenser coils of a refrigerant line, according to an example of the present disclosure.
Figure 6:
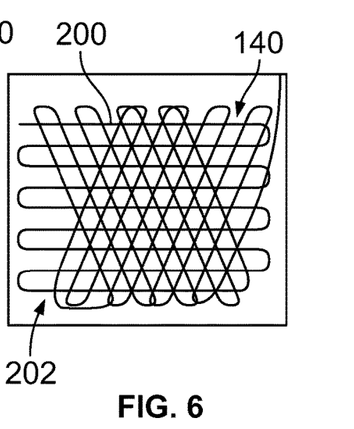
FIG. 6 illustrates a simplified representation of a path of condenser coils of a refrigerant line, according to an example of the present disclosure.

FIG. 4 illustrates a simplified representation of a path 202 of condenser coils 200 of a refrigerant line 140, according to an example of the present disclosure. FIG. 5 illustrates a simplified representation of a path 202 of condenser coils 200 of a refrigerant line 140, according to an example of the present disclosure. FIG. 6 illustrates a simplified representation of a path 202 of condenser coils 200 of a refrigerant line 140, according to an example of the present disclosure.

FIGS. 4-6 shows different examples of paths 202 of the condenser coils 200 of a refrigerant line 140. Referring to FIGS. 1-6, the paths 202 can extend into (or optionally, on) the second container 108, and exhibit serpentine paths in order to increase the surface area through which the fluid (such as coolant) in the condenser coils 200 is precooled before passing into the freezer 142. FIGS. 4-6 show examples of serpentine paths. The paths 202 can be sized and shaped differently than shown in FIGS. 4-6.

The paths 202 can be flat, or tridimensional, for example. The paths 202 can be disposed anywhere on or within the second container 108 (such as a trough). For example, the paths 202 can be at a bottom of the second container 108, across an entire volume covered with the cooling agent 117, and/or the like.

Pipe used for the condenser coils 200 can be made of any material suited for freezer condenser coils, and can include an outer surface with or without radial heat exchanging fins 206. The fins 206 can have a variety of shapes and sizes. More or less fins 206 than shown can be used.

Figure 7:
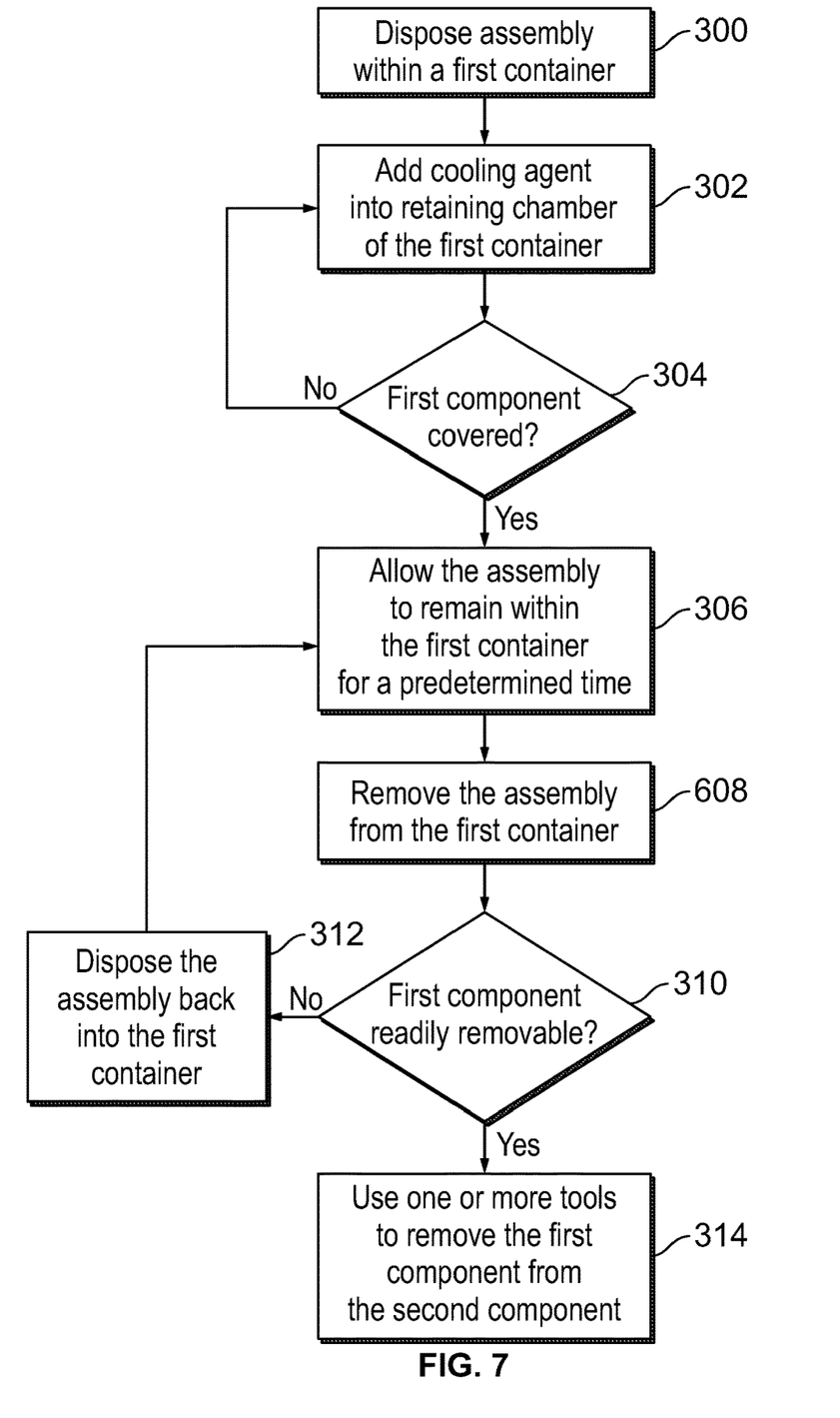
FIG. 7 illustrates a flow chart of a method for removing a first component from a second component, according to an example of the present disclosure.

FIG. 7 illustrates a flow chart of a method for removing a first component from a second component, according to an example of the present disclosure. Referring to FIGS. 1 and 7, at 300, the assembly 105 is disposed within the retaining chamber 116 of the first container 106. At 302, cooling agent 117 is added into the retaining chamber 116. In at least one example, the cooling agent 117 includes dry ice. As another example, the cooling agent 117 includes dry ice pellets mixed with water. As another example, the cooling agent 117 includes liquid Nitrogen, such as if the retaining chamber 116 containing liquid Nitrogen is closed.

At 304, it is determined if the first component 102 is covered by (for example, submerged within) the cooling agent 117. If not, the method returns to 302.

If, however, the first component 102 is covered by the cooling agent 117, the assembly 105 remains within the first container 106 for a predetermined period of time. It has been found that a predetermined period of time between fifty minutes to seventy minutes allows for a metal cap to be readily and easily removed from a main body of a composite rotor blade.

At 308, the assembly 105 is removed from the first container 106. At 310, it is determined if the first component 102 is readily removable from the second component 104. For example, if a chisel can be quickly and easily inserted into a gap between the first component 102 and the second component 104, the first component 102 is readily removable from the second component 104. If the first component 102 is not readily removable, the method proceeds from 310 to 312, at which the assembly 312 is placed back into the retaining chamber 116 of the first container 106, and the method returns to 306.

If, however, the first component 102 is readily removable from the second component 104, the method proceeds from 310 to 314, at which one or more tools (such as a chisel, hammer, wedges, and/or the like) are used to remove the first component 102 from the second component 104.

In at least one example, the systems and methods are configured to remove the first component 102 (for example, a worn-out Nickel erosion cap) from a second component 104 (for example, a main body of a rotor blade). The systems and methods safely, efficiently, and effectively remove the erosion cap from the main body of the rotor blade. As described herein, the systems and methods exploit two phenomena: (a) a difference in coefficient of thermal expansion (CTE) among Nickel, epoxy, and continuous glass fiber-reinforced epoxy (CGFRE), and (b) epoxies are more brittle (less impact resistant) below room temperature than they are at room temperature. The CTE also measures the amount of contraction experienced by a material during cooling.

In at least one example, the Nickel (Ni) erosion cap is bonded to the composite main body by an epoxy adhesive. The CTE of epoxy adhesive, Ni, and CGFRE differs. In particular, the CTE (ppm/F) for Ni, CGFRE, and epoxy adhesive is about 7, 6, and 10, respectively. A similar difference in values exists among the same materials in terms of the contraction per unit length and temperature degree, such as when those materials are cooled from room temperature to freezing temperature, such as the temperature of dry ice (109° F./79° C.). When the three materials are cooled, internal stresses are built, because the three layers (Ni, epoxy, and CGFRE) are bound together, and hence they are not free to contract by a different amount. When a tool, such as a chisel, hits below the Ni erosion cap, the stress imparted by the blow adds to the internal stress, and easily breaks the bond between the Ni and epoxy, and also between the epoxy and CGFRE. Impact resistance of an epoxy decreases as its temperature decreases. Hence, when the epoxy reaches the dry ice temperature, it is easy to crack the epoxy adhesive between Ni erosion cap and blade with a chisel and hammer, and then remove the epoxy pieces from the blade.

Figures 8, 9, 10:
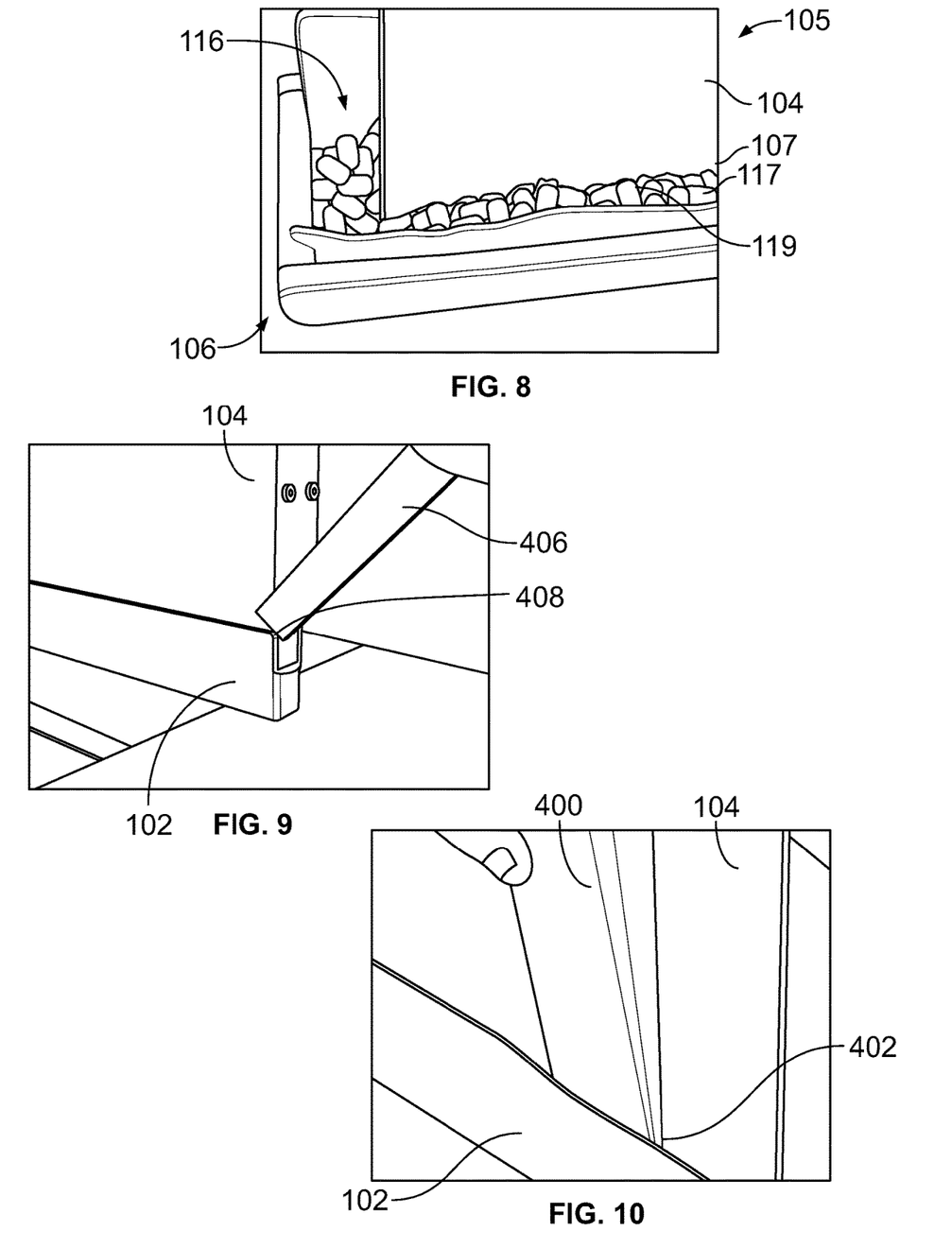
FIG. 8 illustrates a perspective top view of a first component of an assembly disposed within a first container, according to an example of the present disclosure.
FIG. 9 illustrates a perspective end view of the first component being chiseled away from the second component, according to an example of the present disclosure.
FIG. 10 illustrates a perspective front view of a wedge being inserted into a gap between the first component and the second component, according to an example of the present disclosure.

FIG. 8 illustrates a perspective top view of a first component 102 of an assembly 105 disposed within a first container 106, according to an example of the present disclosure. In at least one example, the first component 102 is a Ni erosion cap, the assembly 105 is a rotor blade of a helicopter, and the second component 104 is a composite main body of the rotor blade. The cooling agent 117 can include dry ice pellets 119 by themselves, and/or mixed with water. The cooling agent 117 extends to a level at or above a top level of the first component 102 within the retaining chamber 116 of the first container 106, such as a trough. Thus, the first component 102 is submerged within or otherwise covered by the cooling agent 117.

FIG. 9 illustrates a perspective end view of the first component 102 being chiseled away from the second component 104, according to an example of the present disclosure. FIG. 10 illustrates a perspective front view of a wedge 400 being inserted into a gap 402 between the first component 102 and the second component 104, according to an example of the present disclosure.

Referring to FIGS. 8-10, after the first component 102 has been covered by the cooling agent 117 for a predetermined period of time (for example, it has been found that an hour +/− ten minutes allows the first component 102 to be readily removed from the second component 104), the wedges 400 (such as aluminum wedges) and/or chisels 406 (such as brass or copper chisels) can be used to remove the first component 102 (for example, the Ni erosion cap) from the second component 104 (for example, a main body of a rotor blade). In at least one example, a narrowest chisel 406 can first be inserted into a seam 408 between the first component 102 and the second component 104. The chisel 406 can be inserted into the seam 408 at an outboard end of a trailing edge of the first component 102 (for example, the Ni erosion cap), and worked inboard and forward to separate the first component 102 from the second component 104. After sufficient separation between the first component 102 and the second component 104, a wider chisel and/or the wedges 400 can be used to fully remove the first component 102 from the second component 104. After the first component 102 is removed, in at least one example, 120 grit or 180 grit sandpaper can be used to sand the exposed surface of the second component 104 to remove all residual film adhesive.

Referring to FIGS. 1-10, examples of the present disclosure provide systems and methods that are inexpensive, simple, repeatable, and safe to individuals and the components. The systems and methods take substantially less time and less labor than prior methods.

In case of an assembly 105 whose optimal temperature T to remove the metal layer is higher than 109° F., dry ice can be mixed with a specific quantity of room temperature water in order to achieve a desired soaking temperature T for the assembly 105, according to the following equation, where m(i), m(w) are the mass (g) of dry ice and water, respectively, and h(i), h(w) are the specific heat (J/gK) of dry ice and water, respectively, and 293K and 164K are the temperatures of water and dry ice, respectively:

$$T = [m(w) \times h(w) \times 293\,\text{K} + m(i) \times h(i) \times 164\,\text{K}]/[m(w) \times h(w) + m(i) \times h(i)]$$

Notably, certain articles, such as composite material prepregs, sealants, and adhesives (such as used in aerospace applications), are stored in freezers for months before they are used, otherwise they can deteriorate. For example, the freezer 142 can store the prepregs and adhesives. In the case of a setup using water and dry ice to remove the metal layer bonded by an epoxy adhesive, after the assembly 105 is removed from the first container 106, the cooling agent 117 (such as a mix of water and dry ice) can be drained into the second container 108 having the condenser coils 200 of the refrigerant line 140. The drained cooling agent 117 cools the coolant within the condenser coils 200. The coolant then reaches the freezer 142 via the refrigerant line 140, which consequently reduces the temperature of the freezer 142 and ensures that the articles stored therein are at a desired cool temperature. Such a configuration allows the freezer 142 to draw less power in order to cool the fluid, and such energy saving can convert to a 50% or more cost savings in the warmest months of the year.

Further, the disclosure comprises examples according to the following clauses:

Clause 1. A system for removing a first component from a second component of an assembly, the system comprising:
a first container defining a first retaining chamber, wherein a cooling agent is retained within the first retaining chamber, and wherein at least a portion of the assembly is configured to be disposed within the first retaining chamber so that the first component is covered by the cooling agent within the first retaining chamber;
a second container defining a second retaining chamber, wherein a refrigerant line is coupled to the second retaining chamber;
a conduit that fluidly connects the first retaining chamber to the second retaining chamber,
wherein the at least a portion of the assembly is configured to be removed from the first retaining chamber after a predetermined period of time when the first component is readily removable from the second component, wherein the cooling agent is configured to be drained into the second retaining chamber via the conduit after the at least a portion of the assembly is removed from the first retaining chamber, and wherein the cooling agent within the second retaining chamber is configured to cool fluid circulating through the refrigerant line.

Clause 2. The system of Clause 1, further comprising a freezer in fluid communication with the refrigerant line, wherein the fluid circulating through the refrigerant line is configured to cool components stored within the freezer.

Clause 3. The system of Clauses 1 or 2, wherein the assembly is a main or tail rotor blade of a helicopter, wherein the first component is a metal erosion cap, and wherein the second component is a main body of the rotor blade.

Clause 4. The system of Clause 3, wherein the metal erosion cap is formed of Nickel, and wherein the main body is formed of a composite material.

Clause 5. The system of any of Clauses 1-4, wherein one or both of the first container or the second container is an open trough.

Clause 6. The system of any of Clauses 1-5, wherein the cooling agent comprises dry ice, Clause 7. The system of Clause 6, wherein the cooling agent further comprises water.

Clause 8. The system of any of Clauses 1-7, wherein a first base of the first container is at a first level that is higher than a second level of a second base of the second container.

Clause 9. The system of any of Clauses 1-8, wherein the refrigerant line comprises one or more condenser coils.

Clause 10. The system of any of Clauses 1-9, wherein the predetermined period of time is between fifty and seventy minutes.

Clause 11. The system of any of Clauses 1-10, wherein the first component is configured to be removed from the second component by one or more tools after the at least portion of the assembly is removed from the first retaining chamber.

Clause 12. A method for removing a first component from a second component of an assembly, the method comprising:
retaining cooling agent within a first retaining chamber of a first container;
disposing at least a portion of the assembly within the first retaining chamber so that the first component is covered by the cooling agent within the first retaining chamber;
coupling a refrigerant line to a second retaining chamber of a second container;
fluidly connecting the first retaining chamber to the second retaining chamber by a conduit;
removing the at least a portion of the assembly from the first retaining chamber after a predetermined period of time when the first component is readily removable from the second component;
draining the cooling agent into the second retaining chamber via the conduit after said removing the at least a portion of the assembly from the first retaining chamber; and
cooling fluid circulating through the refrigerant line with the cooling agent.

Clause 13. The method of Clause 12, further comprising cooling one or more articles (such as products, materials, semi-finished products, and/or the like) stored within a freezer that is in fluid communication with the refrigerant line.

Clause 14. The method of Clauses 12 or 13, wherein the assembly is a main or tail rotor blade of a helicopter, wherein the first component is a metal erosion cap, and wherein the second component is a main body of the rotor blade.

Clause 15. The method of Clause 14, wherein the metal erosion cap is formed of Nickel, and wherein the main body is formed of a composite material.

Clause 16. The method of any of Clauses 12-15, wherein the cooling agent comprises dry ice and water, Clause 17. The method of any of Clauses 12-16, wherein a first base of the first container is at a first level that is higher than a second level of a second base of the second container.

Clause 18. The method of any of Clauses 12-17, wherein the predetermined period of time is between fifty and seventy minutes.

Clause 19. The method of any of clauses 12-18, further comprising, after said removing the at least a portion of the assembly from the first retaining chamber, removing the first component from the second component using one or more tools.

Clause 20. A method for removing a Nickel (Ni) erosion cap from a composite main body of a rotor blade of a helicopter, the method comprising:

retaining cooling agent within a first retaining chamber of a first container, wherein the cooling agent comprises dry ice and water;

disposing at least a portion of the rotor blade within the first retaining chamber so that the Ni erosion cap is covered by the cooling agent within the first retaining chamber;

coupling a refrigerant line to a second retaining chamber of a second container, wherein a first base of the first container is at a first level that is higher than a second level of a second base of the second container;

fluidly connecting the first retaining chamber to the second retaining chamber by a conduit;

removing the at least a portion of the rotor blade from the first retaining chamber after a predetermined period of time when the first component is readily removable from the second component, wherein the predetermined period of time is between fifty minutes and seventy minutes (for a specific combination of materials, sizes, and shapes of the components);

after said removing the at least a portion of the assembly from the first retaining chamber, removing the first component from the second component using one or more tools;

draining the cooling agent into the second retaining chamber via the conduit after said removing the at least a portion of the assembly from the first retaining chamber;

cooling fluid circulating through the refrigerant line with the cooling agent; and cooling one or more articles stored within a freezer that is in fluid communication with the refrigerant line.

As described herein, examples of the present disclosure provide systems and method for efficiently and effectively removing a metal cap from a main body of a rotor blade. Further, examples of the present disclosure provide systems and methods that eliminate, minimize, or otherwise reduce a potential of damaging the main body of the rotor blade during the process of removing the metal cap.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for removing a first component from a second component of an assembly, the system comprising:

a first container defining a first retaining chamber, wherein a cooling agent is retained within the first retaining chamber, and wherein at least a portion of the assembly is configured to be disposed within the first retaining chamber so that the first component is covered by the cooling agent within the first retaining chamber;

a second container defining a second retaining chamber, wherein a refrigerant line is coupled to the second retaining chamber;

a conduit that fluidly connects the first retaining chamber to the second retaining chamber, wherein the at least a portion of the assembly is configured to be removed from the first retaining chamber after a predetermined period of time when the first component is readily removable from the second component, wherein the cooling agent is configured to be drained into the second retaining chamber via the conduit after the at least a portion of the assembly is removed from the first retaining chamber, and wherein the cooling agent within the second retaining chamber is configured to cool fluid circulating through the refrigerant line.

2. The system of claim 1, further comprising a freezer in fluid communication with the refrigerant line, wherein the fluid circulating through the refrigerant line is configured to cool articles stored within the freezer.

3. The system of claim 1, wherein the assembly is a rotor blade of a helicopter, wherein the first component is a metal erosion cap, and wherein the second component is a main body of the rotor blade.

4. The system of claim 3, wherein the metal erosion cap is formed of Nickel, and wherein the main body is formed of a composite material.

5. The system of claim 1, wherein one or both of the first container or the second container is an open trough.

6. The system of claim 1, wherein the cooling agent comprises dry ice.

7. The system of claim 6, wherein the cooling agent further comprises water.

8. The system of claim 1, wherein a first base of the first container is at a first level that is higher than a second level of a second base of the second container.

9. The system of claim 1, wherein the refrigerant line comprises one or more condenser coils.

10. The system of claim 1, wherein the predetermined period of time is between fifty and seventy minutes.

11. The system of claim 1, wherein the first component is configured to be removed from the second component by one or more tools after the at least portion of the assembly is removed from the first retaining chamber.

12. A method for a system for removing a first component from a second component of an assembly, the system comprising:
a first container defining a first retaining chamber, wherein a cooling agent is retained within the first retaining chamber, and wherein at least a portion of the assembly is configured to be disposed within the first retaining chamber so that the first component is covered by the cooling agent within the first retaining chamber;
a second container defining a second retaining chamber, wherein a refrigerant line is coupled to the second retaining chamber;
a conduit that fluidly connects the first retaining chamber to the second retaining chamber,
wherein the at least a portion of the assembly is configured to be removed from the first retaining chamber after a predetermined period of time when the first component is readily removable from the second component, wherein the cooling agent is configured to be drained into the second retaining chamber via the conduit after the at least a portion of the assembly is removed from the first retaining chamber, and wherein the cooling agent within the second retaining chamber is configured to cool fluid circulating through the refrigerant line, the method comprising:
retaining the cooling agent within the first retaining chamber of the first container;
disposing the at least a portion of the assembly within the first retaining chamber so that the first component is covered by the cooling agent within the first retaining chamber;
coupling the refrigerant line to the second retaining chamber of the second container;
fluidly connecting the first retaining chamber to the second retaining chamber by the conduit;
removing the at least a portion of the assembly from the first retaining chamber after the predetermined period of time when the first component is readily removable from the second component;
draining the cooling agent into the second retaining chamber via the conduit after said removing the at least a portion of the assembly from the first retaining chamber; and
cooling the fluid circulating through the refrigerant line with the cooling agent.

13. The method of claim 12, further comprising cooling one or more articles stored within a freezer that is in fluid communication with the refrigerant line.

14. The method of claim 12, wherein the assembly is a rotor blade of a helicopter, wherein the first component is a metal erosion cap, and wherein the second component is a main body of the rotor blade.

15. The method of claim 14, wherein the metal erosion cap is formed of Nickel, and wherein the main body is formed of a composite material.

16. The method of claim 12, wherein the cooling agent comprises dry ice and water.

17. The method of claim 12, wherein a first base of the first container is at a first level that is higher than a second level of a second base of the second container.

18. The method of claim 12, wherein the predetermined period of time is between fifty and seventy minutes.

19. The method of claim 12, further comprising, after said removing the at least a portion of the assembly from the first retaining chamber, removing the first component from the second component using one or more tools.

20. A method for a system for removing a Nickel (Ni) erosion cap from a composite main body of a rotor blade of a helicopter, the system comprising:
a first container defining a first retaining chamber, wherein a cooling agent is retained within the first retaining chamber, and wherein at least a portion of the rotor assembly is configured to be disposed within the first retaining chamber so that the Ni erosion cap is covered by the cooling agent within the first retaining chamber;
a second container defining a second retaining chamber, wherein a refrigerant line is coupled to the second retaining chamber;
a conduit that fluidly connects the first retaining chamber to the second retaining chamber,
wherein the at least a portion of the assembly is configured to be removed from the first retaining chamber after a predetermined period of time when the first component is readily removable from the second component, wherein the cooling agent is configured to be drained into the second retaining chamber via the conduit after the at least a portion of the assembly is removed from the first retaining chamber, and wherein the cooling agent within the second retaining chamber is configured to cool fluid circulating through the refrigerant line, the method comprising:

retaining the cooling agent within the first retaining chamber of the first container, wherein the cooling agent comprises dry ice and water;

disposing the at least a portion of the rotor blade within the first retaining chamber so that the Ni erosion cap is covered by the cooling agent within the first retaining chamber;

coupling the refrigerant line to the second retaining chamber of the second container, wherein a first base of the first container is at a first level that is higher than a second level of a second base of the second container;

fluidly connecting the first retaining chamber to the second retaining chamber by the conduit;

removing the at least a portion of the rotor blade from the first retaining chamber after a predetermined period of time when the Ni erosion cap is readily removable from the composite main body, wherein the predetermined period of time is between fifty minutes and seventy minutes;

after said removing the at least a portion of the rotor blade from the first retaining chamber, removing the Ni erosion cap from the composite main body using one or more tools;

draining the cooling agent into the second retaining chamber via the conduit after said removing the at least a portion of the rotor blade from the first retaining chamber;

cooling the fluid circulating through the refrigerant line with the cooling agent; and cooling one or more articles stored within a freezer that is in fluid communication with the refrigerant line.

* * * * *